United States Patent (10) Patent No.: US 10,635,014 B2
Ogura et al. (45) Date of Patent: Apr. 28, 2020

(54) OPTICAL SCANNING APPARATUS AND IMAGE FORMING APPARATUS

(71) Applicant: CANON KABUSHIKI KAISHA, Tokyo (JP)

(72) Inventors: Masahiro Ogura, Saitama (JP); Hisashi Namba, Utsunomiya (JP); Ken Katsuta, Saitama (JP); Yosuke Murakami, Utsunomiya (JP); Yasuaki Otoguro, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/552,507

(22) Filed: Aug. 27, 2019

(65) Prior Publication Data

US 2020/0073277 A1 Mar. 5, 2020

(30) Foreign Application Priority Data

Sep. 3, 2018 (JP) .................................. 2018-164727

(51) Int. Cl.
  *G03G 15/04* (2006.01)
  *G03G 21/16* (2006.01)
  *G02B 26/12* (2006.01)
  *G03G 15/043* (2006.01)

(52) U.S. Cl.
  CPC ..... *G03G 15/04072* (2013.01); *G02B 26/129* (2013.01); *G03G 15/0435* (2013.01); *G03G 21/1647* (2013.01)

(58) Field of Classification Search
  CPC .. G02B 26/121; G02B 26/125; G02B 26/129; G03G 15/04036; G03G 15/0435; G03G 15/04072; G03G 21/1666
  See application file for complete search history.

(56) References Cited

U.S. PATENT DOCUMENTS

| 7,522,326 | B1 | 4/2009 | Otoguro ........................ 347/256 |
| 7,684,099 | B2 | 3/2010 | Otoguro ..................... 359/216.1 |
| 8,947,478 | B2 | 2/2015 | Ishidate et al. ............... 347/137 |
| 9,086,645 | B2 | 7/2015 | Otoguro et al. ... G03G 15/0435 |
| 9,195,063 | B2 | 11/2015 | Ishidate et al. .. G03G 15/04072 |
| 9,316,992 | B2 | 4/2016 | Ishidate et al. ........ G03G 15/80 |
| 9,400,444 | B2 | 7/2016 | Sato et al. ........... G03G 15/043 |

(Continued)

FOREIGN PATENT DOCUMENTS

JP 2000-258719 9/2000

OTHER PUBLICATIONS

U.S. Appl. No. 16/697,673, filed Nov. 27, 2019.
U.S. Appl. No. 16/698,107, filed Nov. 27, 2019.

*Primary Examiner* — Walter L Lindsay, Jr.
*Assistant Examiner* — Jessica L Eley
(74) *Attorney, Agent, or Firm* — Venable LLP

(57) ABSTRACT

An optical scanning apparatus includes a light source, a deflector, an optical member, a supporting portion, a casing, a cover member, a first air current deflecting portion configured to deflect, to a direction from the bottom toward the cover member, an air current generated by rotation of the rotatable polygonal mirror and flowing along a longitudinal direction of the optical member; and a second air current deflecting portion provided on the cover member and configured to deflect, to a direction crossing the longitudinal direction, the air current deflected by the first air current deflecting portion and flowing in the longitudinal direction.

10 Claims, 9 Drawing Sheets

(56) References Cited

U.S. PATENT DOCUMENTS

| | | | |
|---|---|---|---|
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 10,061,119 B2 | 8/2018 | Ogura et al. | G02B 7/181 |
| 10,185,119 B2 | 1/2019 | Ishidate et al. | G02B 7/1821 |
| 10,274,860 B2 | 4/2019 | Otoguro et al. | G03G 15/04072 |
| 10,303,080 B2 | 5/2019 | Ishidate et al. | B41J 2/47 |
| 10,303,081 B2 | 5/2019 | Ishidate et al. | G03G 15/04036 |
| 10,324,396 B2 | 6/2019 | Imai et al. | G02B 26/12 |
| 10,451,870 B2 | 10/2019 | Okada et al. | G02B 26/124 |
| 10,473,922 B2 | 11/2019 | Aruga et al. | G02B 26/124 |
| 10,484,566 B2 | 11/2019 | Namba et al. | G02B 27/0977 |
| 10,498,920 B2 | 12/2019 | Okada et al. | H04N 1/0283 |
| 2008/0025750 A1* | 1/2008 | Yamazaki | G02B 26/121 399/92 |
| 2010/0033787 A1* | 2/2010 | Serizawa | G03G 15/04036 359/197.1 |
| 2018/0231768 A1 | 8/2018 | Nakahata et al. | G02B 26/123 |
| 2018/0259874 A1 | 9/2018 | Okada et al. | G03G 15/0435 |

* cited by examiner

OPTICAL SCANNING APPARATUS AND IMAGE FORMING APPARATUS

FIELD OF THE INVENTION AND RELATED ART

The present invention relates to an optical scanning apparatus and an image forming apparatus and specifically relates to the optical scanning apparatus for use with the image forming apparatus such as a copying machine, a printer, a facsimile machine or a multi-function machine having functions of these machines.

As the optical scanning apparatus for use with the image forming apparatus of an electrophotographic type, an optical scanning apparatus having the following constitution is well known. That is, in this optical scanning apparatus, laser light emitted from a light source is deflected by a rotatable polygonal mirror and is concentrated toward a photosensitive member by an imaging optical system, and then a light spot is formed on a photosensitive surface of the photosensitive member, and the photosensitive surface is scanned with this light spot and thus a latent image is formed on the photosensitive surface.

Inside the optical scanning apparatus, a deflector including the rotatable polygonal mirror for deflecting the laser light omitted from a semiconductor laser and then for scanning the surface of the photosensitive member with the laser light is provided. A predetermined latent image is formed on the photosensitive drum by repeating turning-on and turning-off of the semiconductor laser in synchronism with an operation of the photosensitive member while scanning the surface of the photosensitive member with the laser light by the rotatable polygonal mirror.

The deflector includes a motor as a driving portion in order to rotate the rotatable polygonal mirror at a high speed, and therefore, becomes a high temperature in the case where optical scanning is continuously carried out for a long time. In the case where the rotatable polygonal mirror rotates at the high speed and the deflector is high in temperature, heat of the deflector is carried by air generated by the rotatable polygonal mirror and is diffused as high-temperature air into a periphery of the deflector.

In general, a scanning optical system for imaging light subjected to scanning by the rotatable polygonal mirror is long in a scanning direction and is provided in the neighborhood of the deflector for the purpose of a compact installation. As a result, with respect to a direction in which the scanning optical system is disposed, the scanning optical system itself constitutes an obstacle, and therefore, air from the deflector does not readily flow in the direction of the scanning optical system. In that case, the high-temperature air from the deflector one flows in a direction parallel to the scanning optical system and blows against a side wall of an optical box and then flows along the side wall so as to spread all over an entirety of the optical box.

For this reason, a temperature of the side wall of the optical box against which the high-temperature air from the deflector first blows becomes high. Further, in the case where mirrors and lenses of the scanning optical system are supported by supporting portions at opposite end portions with respect to a longitudinal direction, a temperature of the supporting portion close to the side wall of the optical box also becomes high. When the temperature of the side wall of the optical box increases, the optical box causes warpage. Further, when a temperature of the supporting portions for supporting the mirrors and the lenses increase, attitudes of the mirrors and the lenses change. That is, the scanning optical system is disposed in the neighborhood of the deflector, so that the temperatures of the side wall of the optical box and the supporting portions of the scanning optical system increase and thus, an irradiation position of the laser light largely fluctuates with temperature rise. Particularly, in an image forming apparatus in which image forming portions for four colors are integrally provided, a problem such that fluctuations in irradiation position of the image forming portions for the four colors occur at different times and thus a resultant color deviates from an intended color arises. In order to solve such a problem, for example, in Japanese Laid-Open Patent Application 2000-258719, a constitution in which a heat dissipation area is increased by subjecting an upper surface cover of a deflector to bead process in a concentric shape with a rotatable polygonal mirror and thus a heat dissipation effect is enhanced is disclosed.

However, even when the heat dissipation effect at a periphery of the rotatable polygonal mirror is enhanced in the constitution as in a conventional example, the following problem arises. That is, air warmed by the deflector principally includes a component with respect to a circumferential direction of the deflector, and therefore, the high-temperature air flows from the deflector toward a side wall positioned with respect to a main scan direction, so that there is a liability that temperature rise of a supporting portion of a scanning optical system. As a result, there is a liability that an irradiation position deviation occurs and subsequently causes color misregistration.

SUMMARY OF THE INVENTION

According to an aspect of the present invention, there is provided an optical scanning apparatus comprising: a light source configured to emit a light beam; a deflector including a rotatable polygonal mirror for deflecting the light beam emitted from the light source and configured to rotate the rotatable polygonal mirror; an optical member configured to guide the light beam, deflected by the rotatable polygonal mirror, to a photosensitive drum; a supporting portion supporting the optical member; a casing including a bottom and a side wall standing from the bottom, wherein the light source is provided on the side wall, and the supporting portion is provided on the bottom; a cover member configured to cover an opening which is surrounded by the side wall and which permits passing of the deflector when the deflector is installed on the bottom; a first air current deflecting portion configured to deflect, to a direction from the bottom toward the cover member, an air current generated by rotation of the rotatable polygonal mirror and flowing along a longitudinal direction of the optical member; and a second air current deflecting portion provided on the cover member and configured to deflect, to a direction crossing the longitudinal direction, the air current deflected by the first air current deflecting portion and flowing in the longitudinal direction.

According to another aspect of the present invention, there is provided an image forming apparatus comprising: a photosensitive drum; the above-described optical scanning apparatus configured to form an electrostatic latent image on the photosensitive drum; a developing device configured to develop the electrostatic latent image, formed by the optical scanning apparatus, into a toner image; and an endless belt onto which the toner image formed by the developing device is transferred.

Further features of the present invention will become apparent from the following description of exemplary embodiments with reference to the attached drawings.

Figure 6:
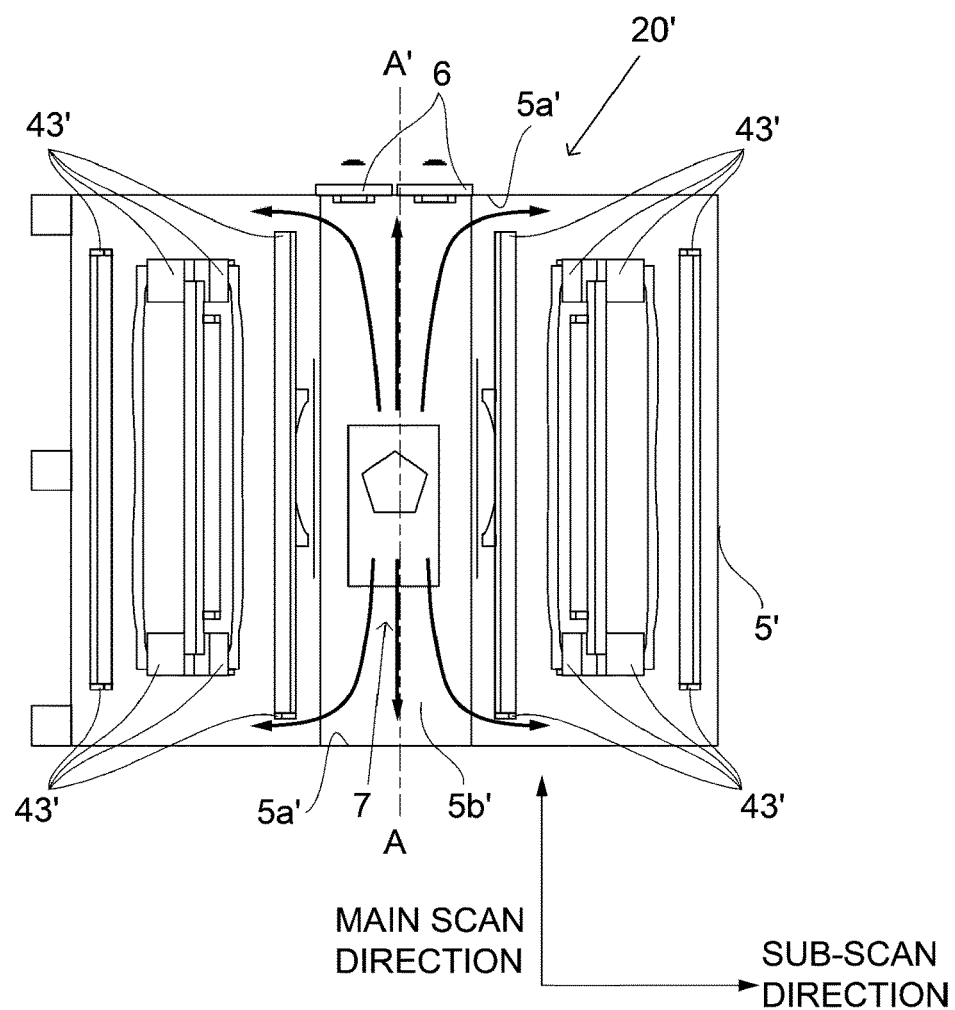
Figure 6:
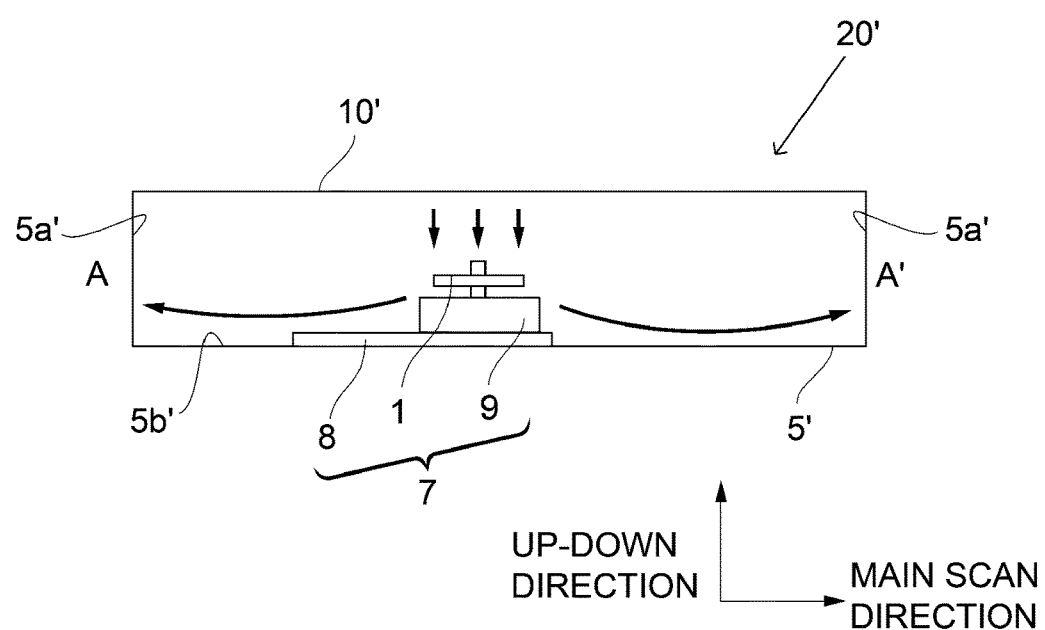

Parts (a) and (b) of FIG. 6 are schematic views showing a flow of air from a conventional deflector for comparison with the Embodiment 1.

Figure 7:
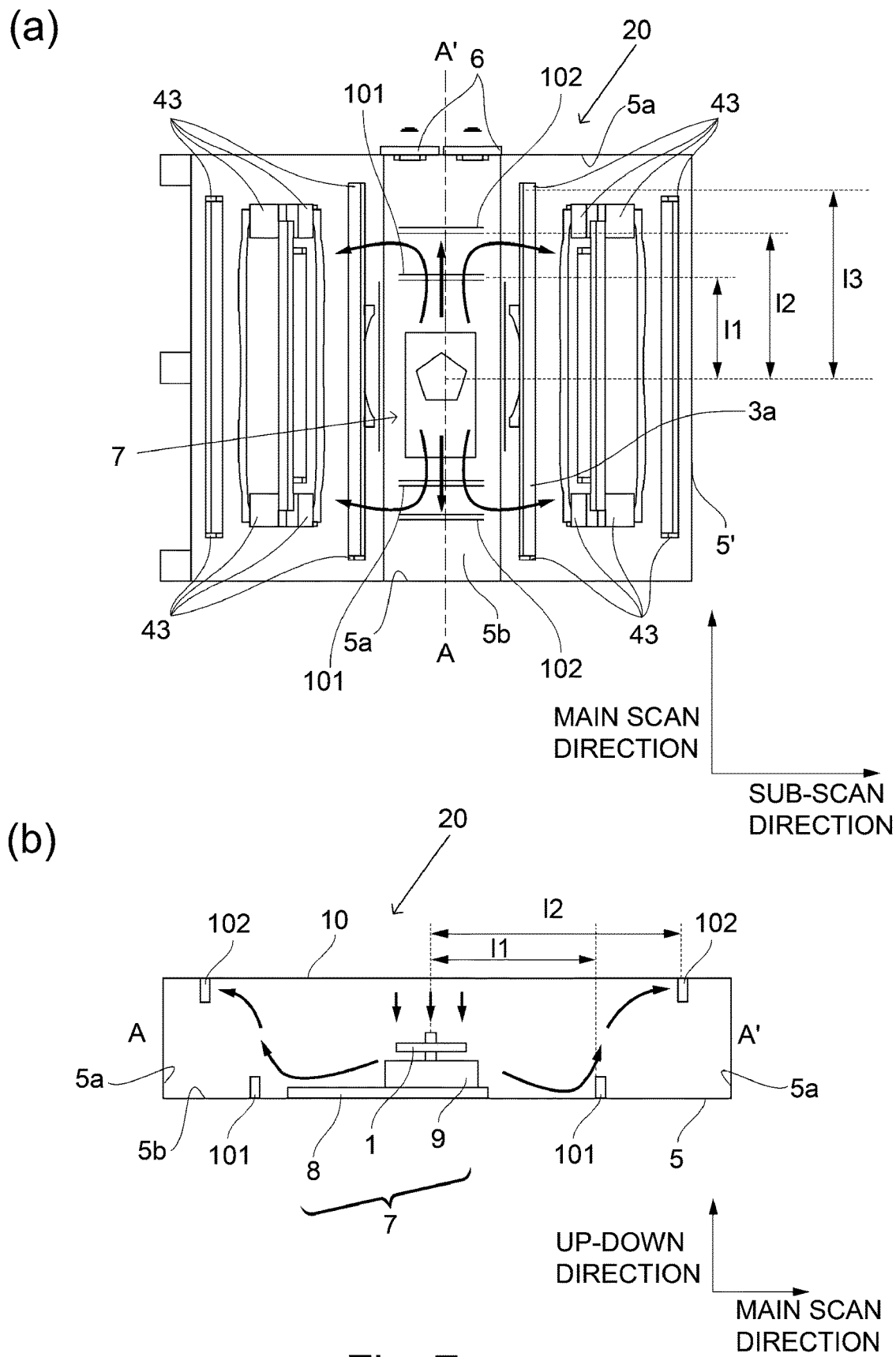

Parts (a) and (b) of FIG. 7 are schematic views showing a flow of air from a deflector in the Embodiment 1.

Figure 8:
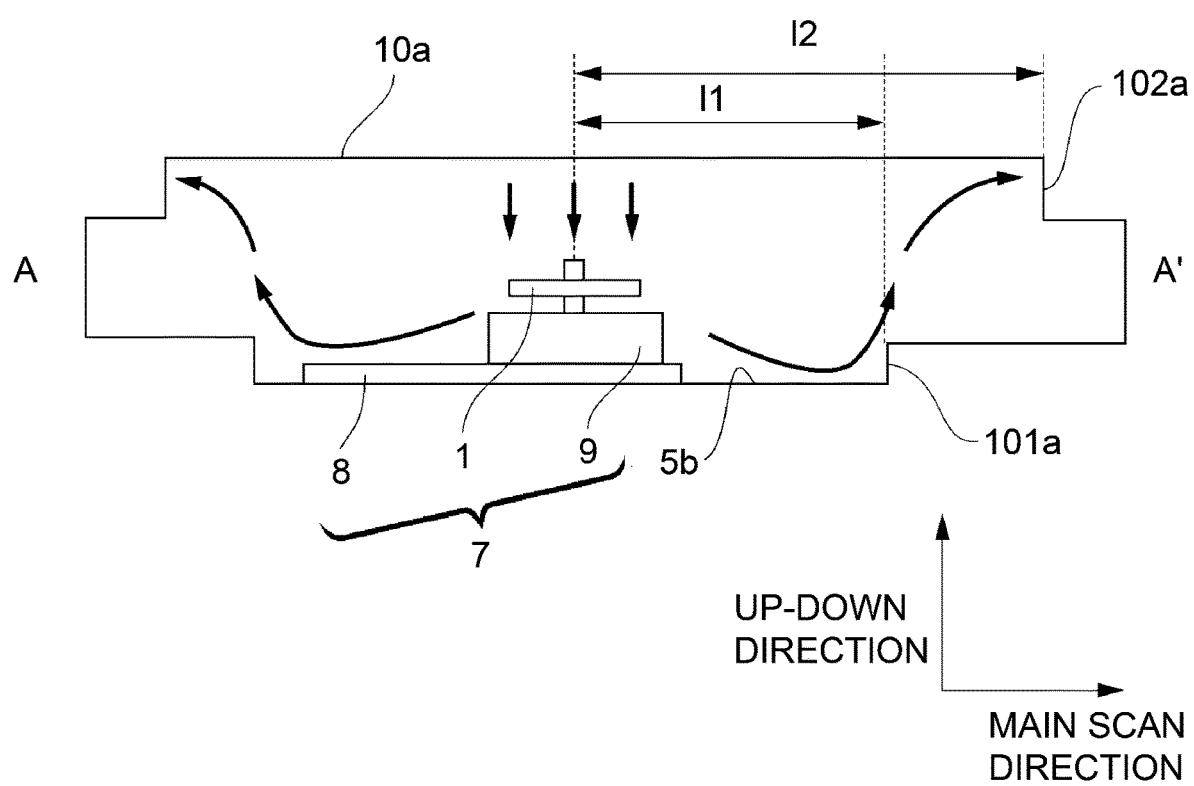

FIG. 8 is a schematic view showing a flow of air from a deflector in a modified embodiment of the Embodiment 1.

Figure 9:
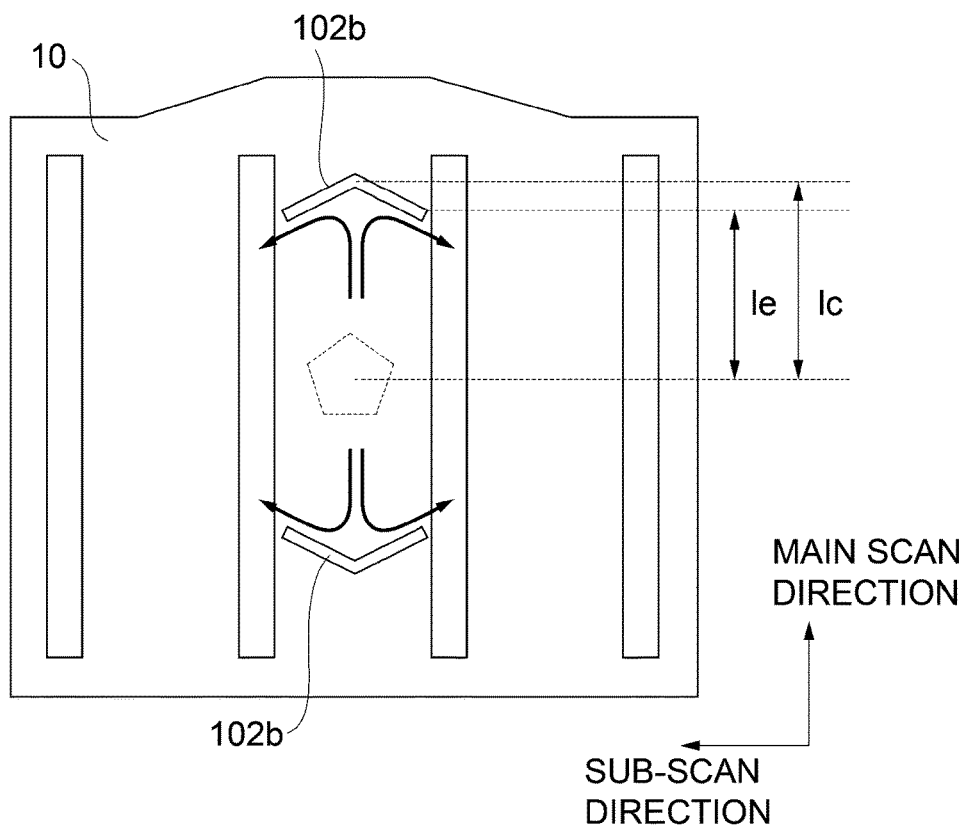
Figure 9:
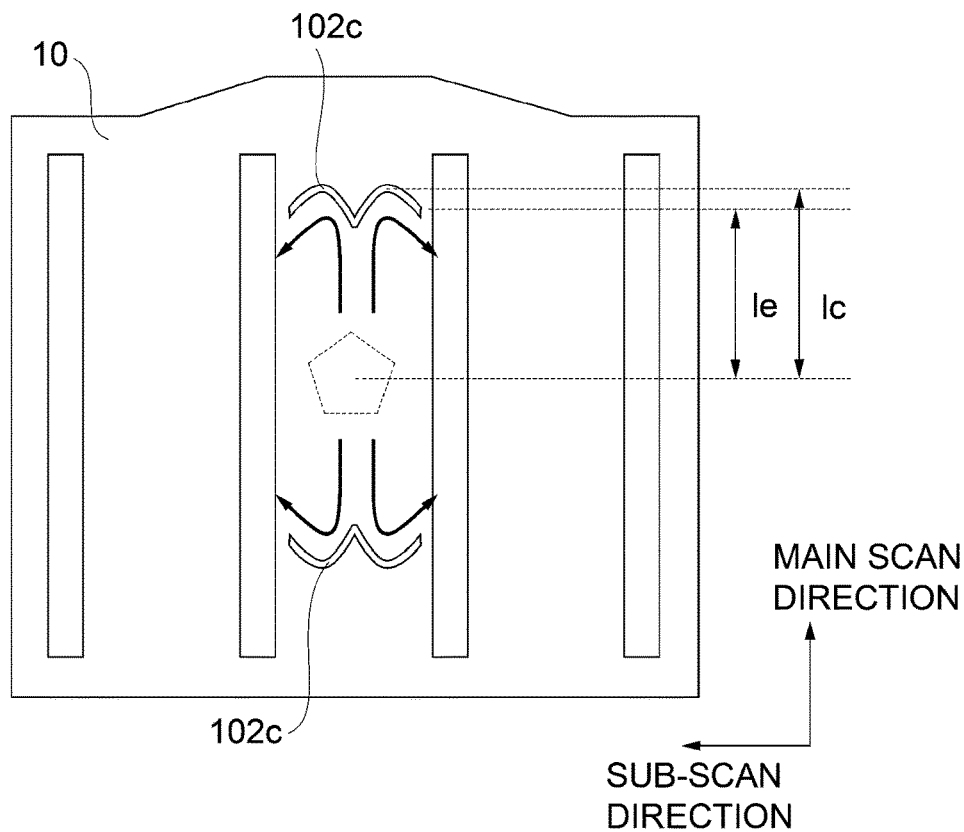

Parts (a) and (b) of FIG. 9 are schematic views of an upper cover of an optical scanning apparatus in a second embodiment.

DESCRIPTION OF THE INVENTION

In the following, embodiments for carrying out the present invention will be specifically described with reference to the drawings.

Embodiment 1

[Image Forming Apparatus]

Figure 1:
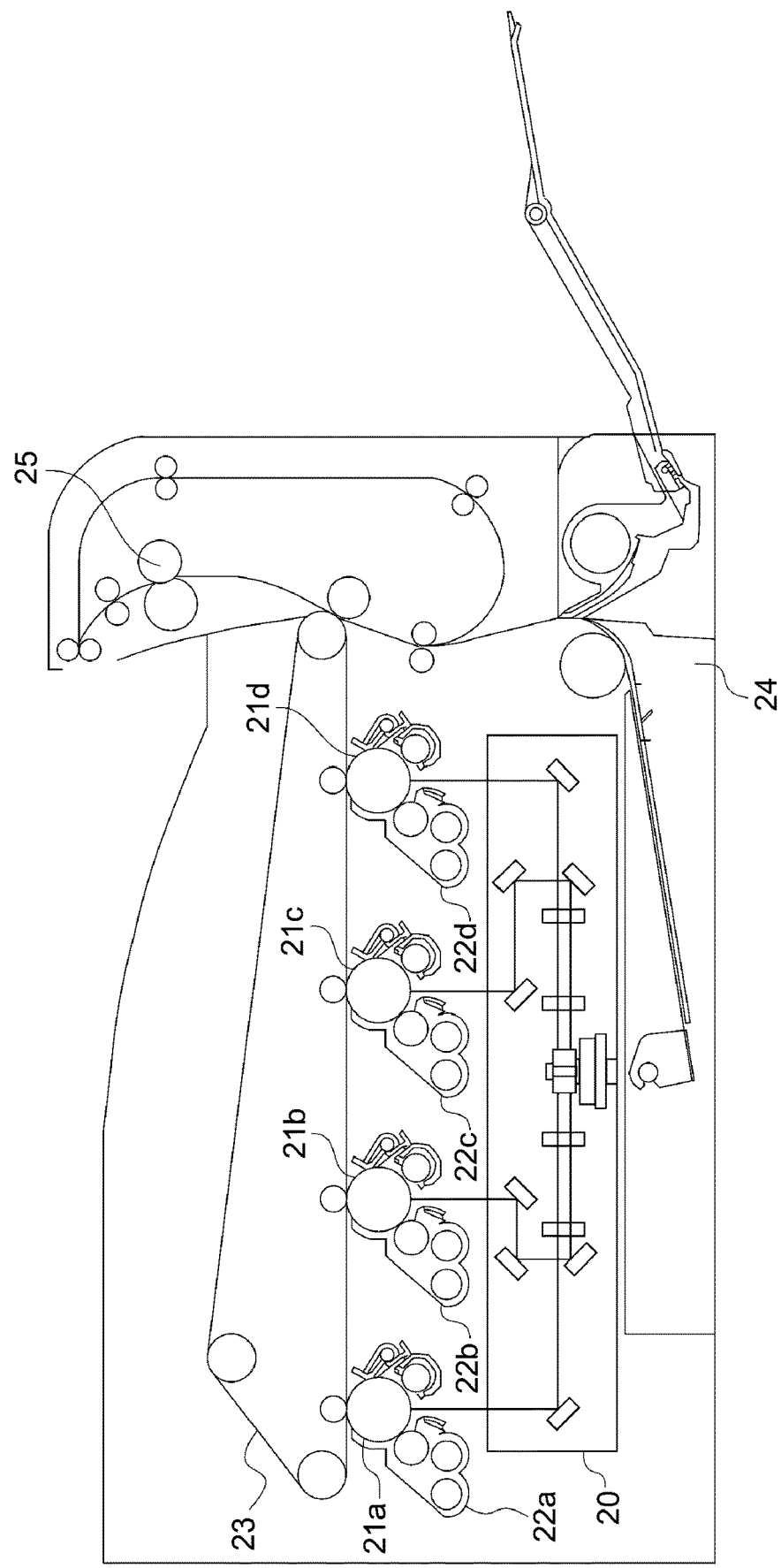
FIG. 1 is a schematic view of an image forming apparatus of an Embodiment 1.

FIG. 1 is a schematic sectional view of an image forming apparatus which is a tandem color printer in which an optical scanning apparatus 20 of an Embodiment 1. The image forming apparatus of this embodiment employs a type in which light exposure is carried out from a lower side of an image forming portion as shown in FIG. 1, and the optical scanning apparatus 20 emits a light beam toward photosensitive drums 21 above the optical scanning apparatus 20. The image forming apparatus of this embodiment has a constitution in which four photosensitive drums 21a-21d (hereinafter, a-d are omitted in some instances) are exposed to light (light beam) by a single optical scanning apparatus 20. These photosensitive drums 21 correspond to colors of yellow, magenta, cyan and black, respectively. Then, when electrostatic latent images are formed on the respective photosensitive drums 21, the electrostatic latent images are developed into toner images by developing devices 22. The toner images are transferred onto recording paper fed from a feeding cassette 24 through an intermediary transfer belt 23 which is an example of an endless belt. As regards the recording paper on which unfixed toner images are transferred, the toner images are fixed by a fixing device 25 and then are discharged to an outside of the image forming apparatus. Incidentally, the image forming apparatus to which the present invention is applied is not limited to the image forming apparatus shown in FIG. 1.

[Optical Scanning Apparatus]

Figure 2:
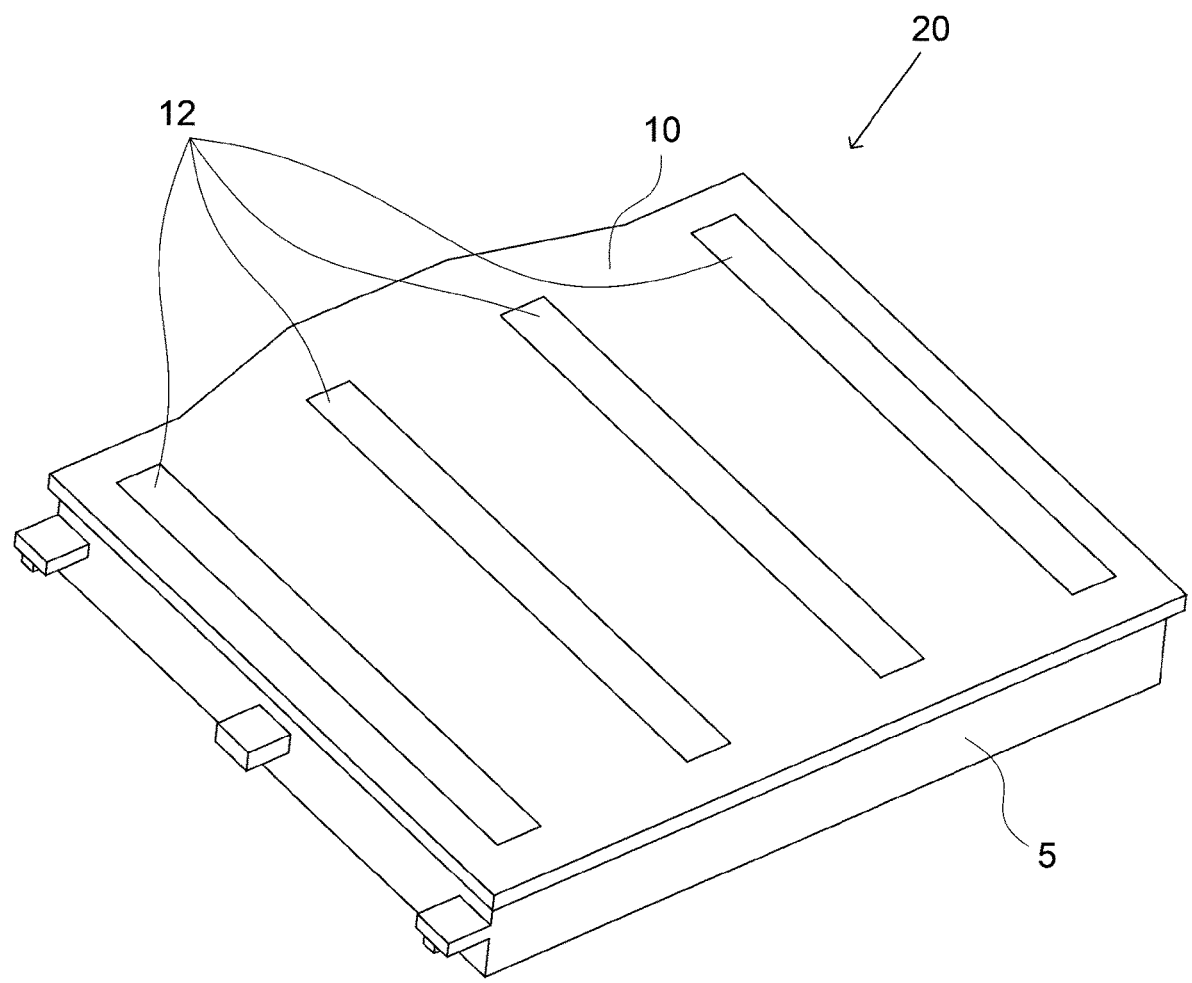
FIG. 2 is a schematic view of an optical scanning apparatus of the Embodiment 1.
Figure 2:
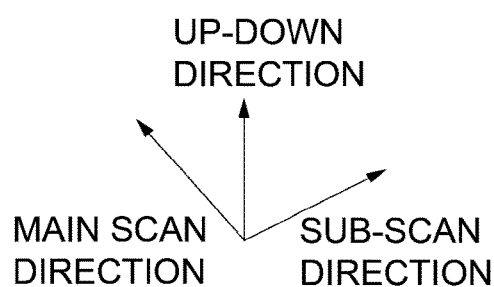
Figure 3:
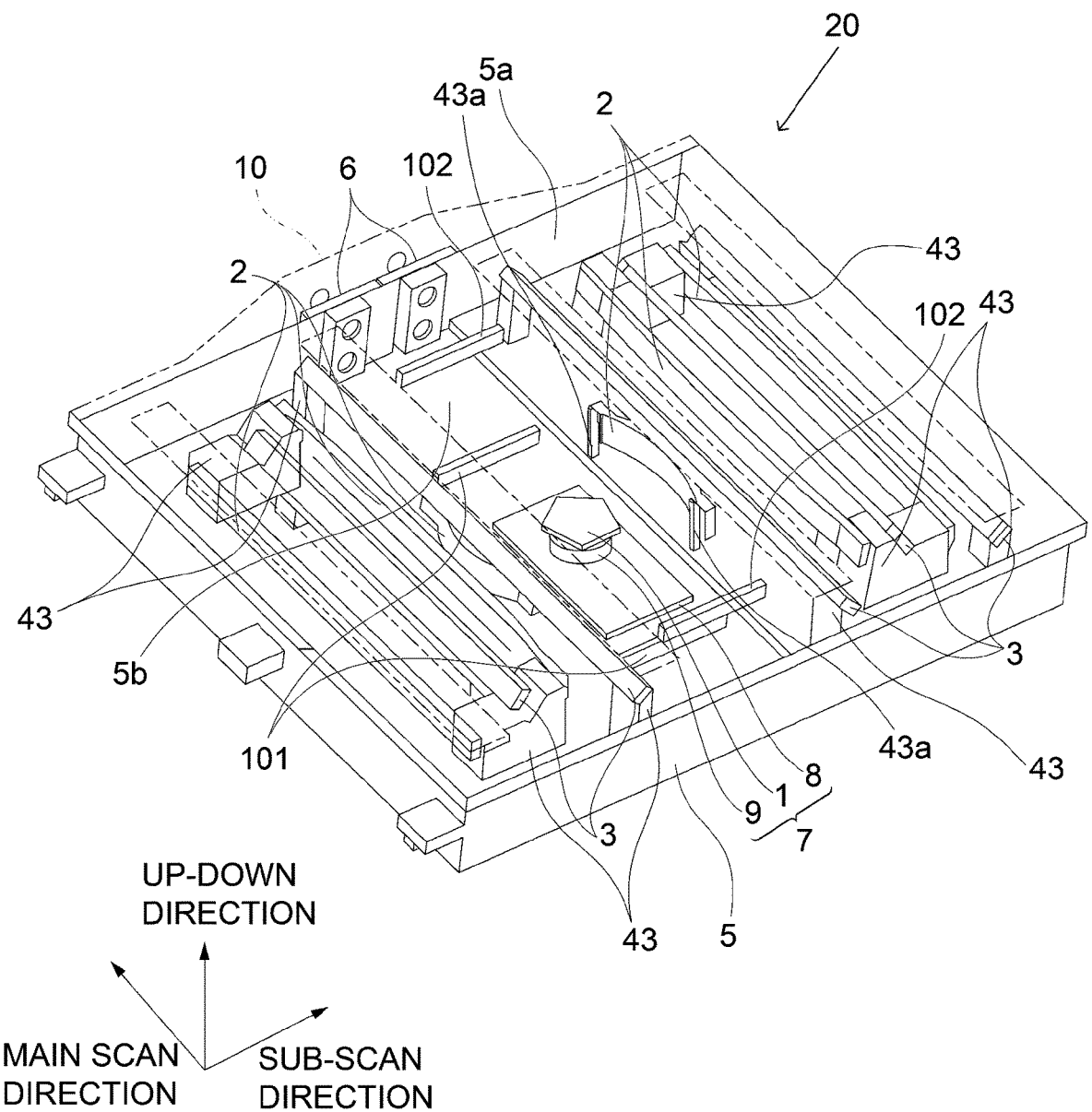
FIG. 3 is a schematic view of an inside of the optical scanning apparatus of the Embodiment 1.

FIGS. 2 and 3 are schematic views showing an entirety of the optical scanning apparatus 20. The optical scanning apparatus 20 includes an optical box 5 including a bottom plate 5b constituting a bottom and side walls standing from the bottom plate 5b, and includes an upper cover 10 for covering (sealing) the optical box 5. The side walls are provided on four sides, and particularly, two side walls substantially perpendicular to a longitudinal direction of optical members are referred to as side walls 5a. The upper cover 10 is a cover member for covering (closing) an opening for permitting passing of a deflector 7 described later when the deflector 7 is installed on the bottom plate 5b. FIG. 2 shows a state in which the upper cover 10 of the optical scanning apparatus 20 is closed. The upper cover 10 is provided with window portions 12 formed with a transparent member or the like for permitting transmission of laser light which is the light beam emitted from an inside of the optical scanning apparatus 20 to the photosensitive drums 21. FIG. 3 is the schematic view showing a transmission state of the upper cover 10 so that the inside of the optical scanning apparatus 20 is in sight. In FIG. 3, the upper cover 10 is indicated by a chain double-dashed line. In the optical scanning apparatus 20 shown in FIGS. 2 and 3, the deflector 7 for deflecting the laser light which is emitted from a light source 6 and which is based on an image signal and for scanning photosensitive drum surfaces with the laser light is disposed at a central potion. The deflector 7 includes a rotatable polygonal mirror 1, a driving portion 9 which is a driving means for rotationally driving the rotatable polygonal mirror 1, and a substrate 8 for controlling the driving portion 9. The optical scanning apparatus 20 further includes an scanning optical system (optical members) for performing scanning while imaging the laser light on the photosensitive drums 21 which are members-to-be-scanned positioned opposed to the rotatable polygonal mirror 1. The scanning optical system is constituted by a lens group 2 for imaging the light beams with which the photosensitive drums 21 are exposed for forming the electrostatic latent images and by a deflecting mirror group 3 for guiding, to the photosensitive drums 21, the laser light which is deflected and subjected to scanning. Each of the lens group 2 and the mirror group 3 includes components corresponding to the colors of yellow, magenta, cyan and yellow, respectively, and is disposed. The respective optical members (the lens group 2 and the mirror group 3) of the scanning optical system are elongated members, and at least at opposite end portions, supporting members 43 which are supporting portions for supporting the respective optical members are provided. Incidentally, the supporting member 43 positioned closest to the rotatable polygonal mirror 1 with respect to a sub-scan direction is particularly referred to as a supporting member 43a. The optical scanning apparatus 20 includes bottom projection 101 provided on the bottom plate 5b of the optical box 5 and cover projections 102 provided on the upper cover 10 on a side opposing the inside of the optical box 5. The cover projections 102 are members provided on the upper cover 10, but are indicated by a solid line in FIG. 3. The bottom projections 101 and the cover projections 102 will be described specifically later.

As shown in FIG. 3, in this embodiment, the deflector 7 is provided in the neighborhood of a central portion inside the optical scanning apparatus 20. Further, the light source 6 includes a plurality of light sources including a first light source for emitting a first light beam and a second light source for emitting a second light beam. The first light beam emitted from the first light source is deflected in a negative direction with respect to the sub-scan direction in FIG. 3 by the rotatable polygonal mirror 1, and the second light beam emitted from the second light source is deflected in a positive direction with respect to the sub-scan direction in FIG. 3 by the rotatable polygonal mirror 1. That is, the first light beam and the second light beam are deflected toward opposite sides from each other with respect to a rotation shaft of the rotatable polygonal mirror 1.

Further, in this embodiment, when the optical scanning apparatus 20 is seen in a flat plane perpendicular to a rotational axis of the rotatable polygonal mirror 1, the respective light sources 6 and the rotatable polygonal mirror 1 are not on the same flat plane. For that reason, the first light beam emitted from the first light source is incident on the rotatable polygonal mirror 1 in an oblique direction relative to the rotational axis, and the second light beam emitted from the second light source is also incident on the rotatable polygonal mirror 1 in an oblique direction relative to the rotational axis.

Here, definitions of a coordinate system in this embodiment shown in FIGS. 2 to 8 will be described. An elongation direction (longitudinal direction) of each of the lens group 2 and the mirror group 3 of the scanning optical system is a main scan direction, and a direction perpendicular to the main scan direction in a plane parallel to the bottom (bottom plate 5a) of the optical box 5 is a sub-scan direction. Further, directions perpendicular to the main scan direction and the sub-scan direction and directed from the bottom plate 5b toward the upper cover 10 of the optical box 5 and directed from the upper cover 10 toward the bottom plate 5b of the optical box 5 are referred to as an up-down direction, in which the direction directed from the upper cover 10 toward the bottom plate 5b is defined as a downward direction and the direction directed from the bottom plate 5b toward the upper cover 10 is defined as an upward direction. Further, the optical member closest to the deflector 7 with respect to the sub-scan direction is defined as a first optical member, and the optical member second closest to the deflector 7 with respect to the sub-scan direction is defined as a second optical member.

[Neighborhood of Deflector]

Figure 4:
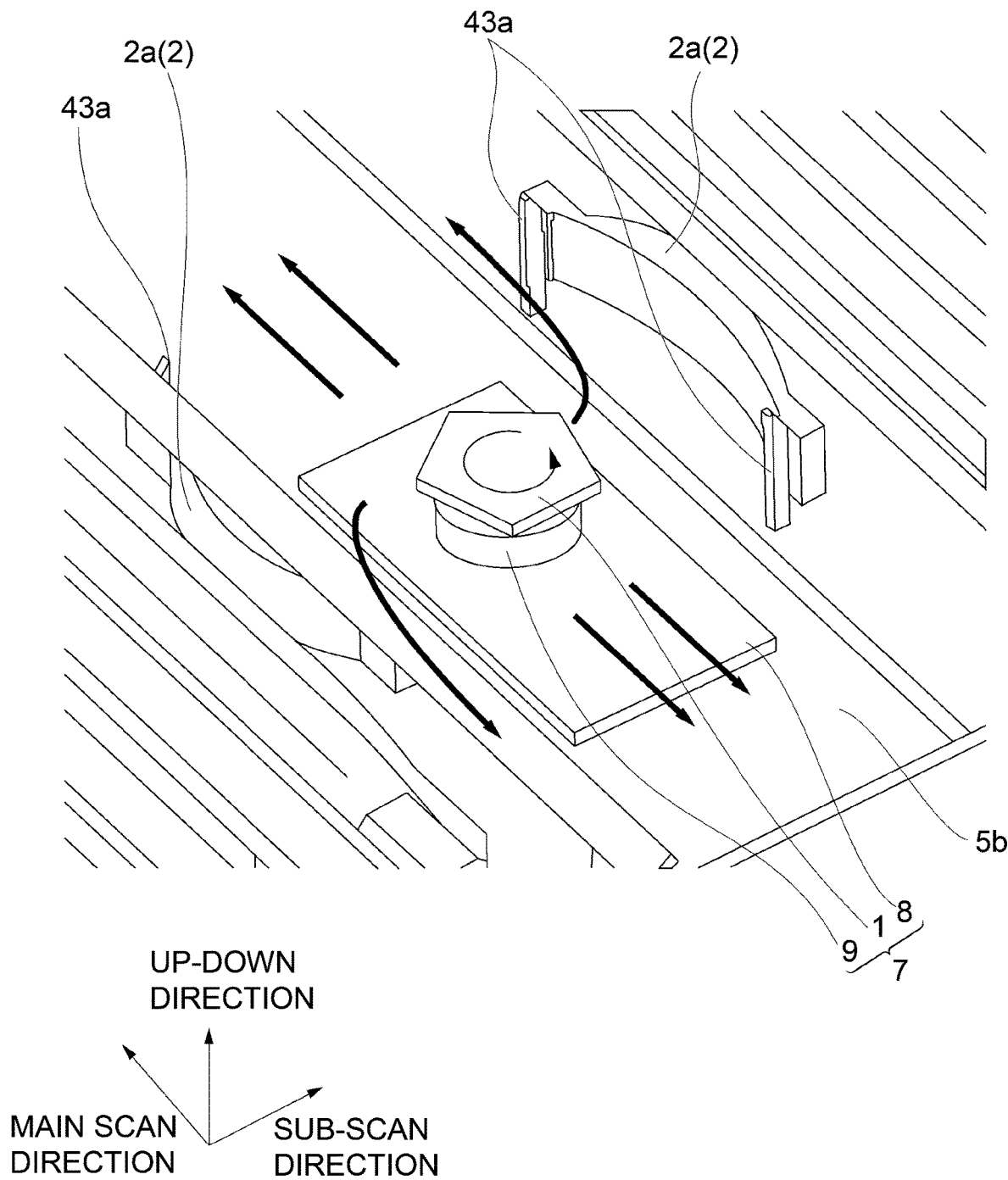
FIG. 4 is a schematic view showing a flow of air from a deflector in a main scan direction in the Embodiment 1.
Figure 5:
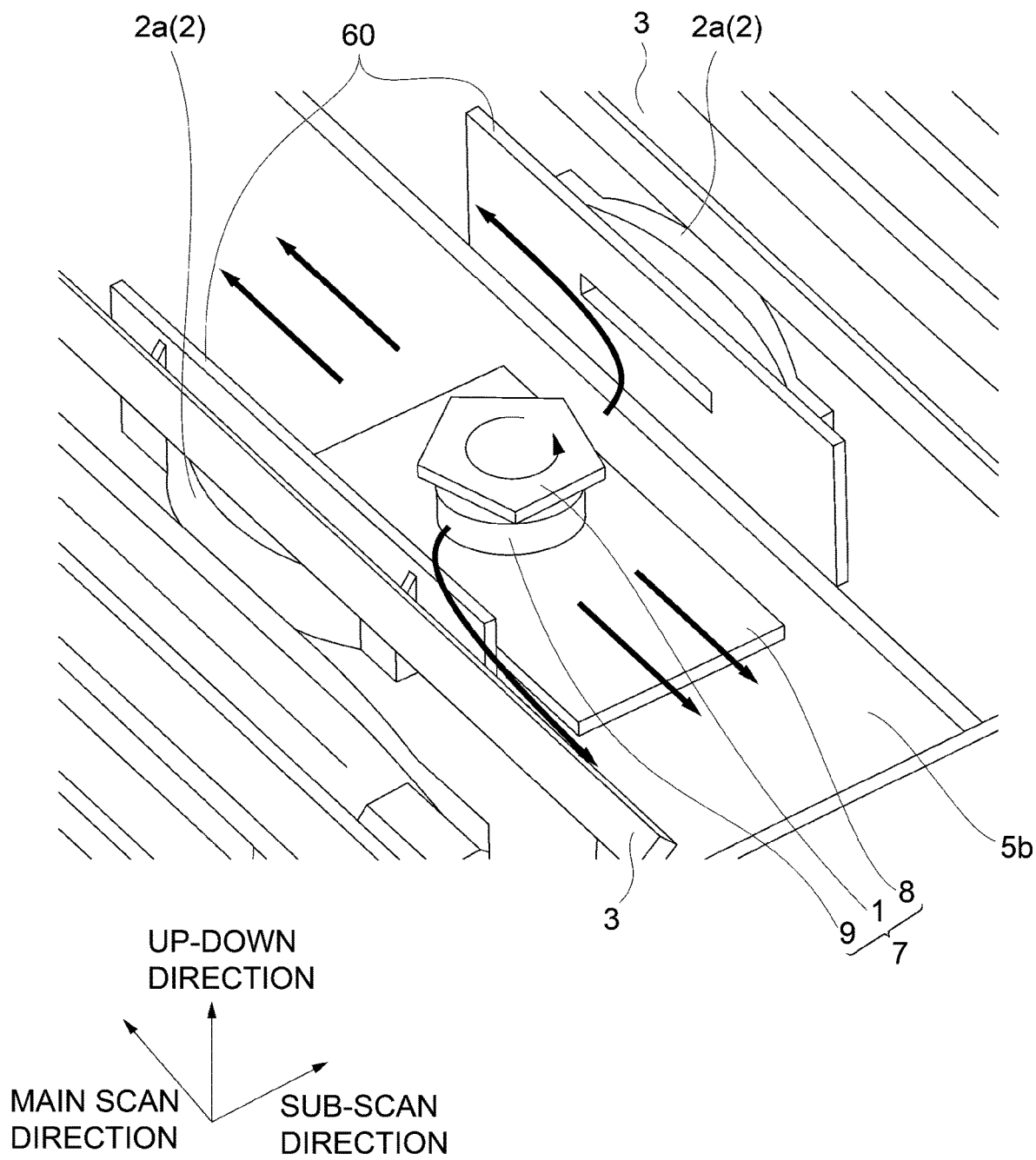
FIG. 5 is a schematic view showing a flow of air from a deflector in the main scan direction in the Embodiment 1.

FIGS. 4 and 5 are enlarged views each showing a neighborhood of the deflector 7, of the lens group 2, a first lens 2a which is a closest lens to the deflector 7 with respect to the sub-scan direction is supported at least at opposite end portions with respect to the longitudinal direction by the supporting members 43a. The rotatable polygonal mirror 1 rotates at a high speed, and therefore, air flows from an upper portion of the deflector 7 and radially flows about the deflector 7. The air flowing radially (hereinafter also referred to as a air current) flows along the bottom plate 5b of the optical box 5. The deflector 7 is sandwiched between elongated two first lenses 2a with respect to the sub-scan direction. For this reason, the flow of the air in the sub-scan direction blows against the first lens 2a and is changed in direction to the main scan direction. Accordingly, as regards the flow of the air from the deflector 7, a flow of the air in the main scan direction is dominant.

FIG. 5 shows an example in which wall-like members 60 provided for preventing flare light from entering the first lens 2a are also configured to hold the first lens 2a. Each of the wall-like member 60 functions as a supporting portion for supporting a closest optical member, of the optical members, to the deflector 7 with respect to the sub-scan direction and also functions as a shielding member for shielding the flare light from entering the closest optical member to the deflector 7. In this case, the flow of the air from the deflector 7 in the sub-scan direction is suppressed by the wall-like member 60, and the flow of the air from the deflector 7 in the main scan direction is more dominant.

[Conventional Optical Scanning Apparatus]

In order to clarity a difference from the Embodiment 1, a schematic view of an optical scanning apparatus 20' and an inside air current in a conventional constitution is FIG. 6. In FIG. 6, a part of members, reference numerals or symbols and lead lines are emitted for visibility (viewability). Part (a) of FIG. 6 is a top plan view of a conventional optical box 5' and part (b) of FIG. 6 is a sectional view of the conventional optical box 5' taken along A-A' line of part (a) of FIG. 6. As described above, as regards the deflector 7 sandwiched by the optical members, ambient air is warmed by heat generation of the deflector 7 and the flow of the air (air current) in the main scan direction is dominant. As shown in part (a) of FIG. 6, flows of high-temperature air in the main scan direction once blow against side walls 5a' provided substantially perpendicular to the main scan direction and then are changed in direction thereof. Thereafter, the air changed in direction by blowing against the side walls 5a' flows all over an entirety of the optical box 5' along the side walls 5a' provided substantially perpendicular to the main scan direction. For this reason, temperatures of the side walls 5a' against which the air from the deflector 7 first blows and which are provided substantially perpendicular to the main scan direction of the optical box 5' and temperatures of supporting members 43' for supporting opposite end portions of a mirror group 3 and a lens group 2 of a scanning optical system become high.

When the temperatures of the side walls 5a provided substantially perpendicular to the main scan direction in the optical box 5' increase, the optical box 5' causes warpage, so that there is a liability that attitudes of the mirror group 3 and the lens group 2 of the scanning optical system change. Particularly, light sources 6 are fixed to the side wall 5a' provided substantially perpendicular to the deflector 7 in the main scan direction, so that due to temperature rise of the side wall 5a', there is a liability that the light sources 6 are inclined. Inclination of the light sources 6 is sensitive to a fluctuation of an irradiation position of the laser light, and therefore, particularly has a large influence on the irradiation position fluctuation. Further, the supporting members 43' for supporting the optical members are disposed in the neighborhood of the side walls 5a' provided substantially perpendicular to the deflector 7 in the optical box 5' with respect to the main scan direction. For that reason, temperatures of these regions become high by the high-temperature air from the deflector 7, so that there is a liability that the supporting members 43' for the mirror group 3 and the lens group 2 of the scanning optical system are locally deformed and thus the attitudes of the mirror group 3 and the lens group 2 are changed. Particularly, in the image forming apparatus of the type in which the image forming portions for the four colors are integrally provided, fluctuations in irradiation position for the respective colors with changes in attitude of the light sources 6, the mirror group 3 and the lens group 2 are caused to occur, so that color misregistration occurs. Such a problem arises.

[Optical Scanning Apparatus of Embodiment 1]

The optical scanning apparatus 20 of the Embodiment 1 is shown in FIG. 7. In FIG. 7, a part of members, reference numerals or symbols and lead lines are emitted for visibility (viewability). Part (a) of FIG. 7 is a top plan view of the optical box 5 and part (b) of FIG. 7 is a sectional view of the optical box 5 taken along A-A' line of part (a) of FIG. 7. As shown in FIG. 7, the optical scanning apparatus 20 includes bottom projections 101 and cover projections 102 for inducing flows of the air from the deflector 7 in the main scan direction which includes directions in which the flows of the air are distant from the side walls 5a and the supporting members 43 which are sensitive to the optical fluctuations. The bottom projections 101 which are an example of a first air current deflecting portion deflect the flows of the air generated by the rotatable polygonal mirror 1 and moved in the longitudinal direction of the optical members by raising the flows of the air from the bottom plate 5a toward the upper cover 10. Further, the cover projections 102 which are an example of a second air current deflecting portion deflect the flows of the air in the longitudinal direction raised by the bottom projections 101, in the sub-scan direction which is a direction crossing the longitudinal direction. Thus, the air generated by rotation of the rotatable polygonal mirror 1 is deflected toward the upper cover 10 by the bottom projections 101, and the deflected air is then deflected by the cover projections 102.

The bottom projections 101 are first projections which are provided on the bottom plate 5b at two places so as to sandwich the deflector 7 at positions each having a distance 11 from a rotation shaft of the rotatable polygonal mirror 1 with respect to the longitudinal direction and which are projected toward the upper cover 10. The cover projections 102 are second projections which are provided on the surface, opposing the bottom plate 5b, of the upper cover 10 at two places so as to sandwich the deflector 7 at positions each having a distance 12 from the rotation shaft of the rotatable polygonal mirror 1 with respect to the longitudinal direction and which are projected toward the bottom plate 5b. The cover projections 102 are formed on the upper cover 10 in a shape substantially parallel to the sub-scan direction (direction crossing the longitudinal direction).

The bottom projections 101 and the cover projections 102 have wall surfaces extending in the sub-scan direction which corresponds to longitudinal directions thereof, and are disposed so as to prevent the flows of the air in the main scan direction. Further, the distance 11 which is a first distance between the bottom projection 101 and the deflector 7 (the rotation shaft of the rotatable polygonal mirror 1) with respect to the main scan direction is shorter than the distance 12 which is a second distance between the cover projection 102 and the deflector 7 (the rotation shaft of the rotatable polygonal mirror 1) with respect to the main scan direction (11<12).

The flows of the air from the deflector 7 in the Embodiment 1 will be described. Parts (b) of FIG. 7 is the sectional view of the optical box 5 taken along the A-A' line indicated by a chain line, and the air blowing against the deflector 7 from above flows in the main scan direction along the bottom plate 5b of the optical box 5 and first blows against the bottom projections 101. Then, the flows of the air blowing against the bottom projections 101 are raised and then move along an inside of the upper cover 10 in the main scan direction and blow against the cover projections 102. As shown in part (a) of FIG. 7, the flows blowing against the cover projections 102 are branched into components with respect to the sub-scan direction (the longitudinal direction of the cover projections 102) and diffuse all over the entirety of the optical box 5.

Thus, the air warmed by the deflector 7 can be induced by the bottom projections 101 and the cover projections 102 so as to avoid the side walls 5a of the optical box 5 and the supporting members 43 for supporting the lens group 2 and the mirror group 3. That is, by arrangement of the bottom projections 101 and the cover projections 102, temperature rises of the side walls 5a of the optical box 5 and the supporting members 43 for supporting the lens group 2 and the mirror group 3 are suppressed, so that a deviation in irradiation position, i.e., a color misregistration can be remarkably reduced. Further, by inducing the flows of the air by the bottom projections 101 and the cover projections 102, the warmed air can be distributed over the entirety of the inside of the optical box 5, and therefore, a difference in temperature of the inside of the optical box 5 can also be made small. A thermal deformation amount of an entirety of the optical box 5 can be suppressed by suppressing the temperature difference, in other words, by uniformizing a temperature distribution and therefore, a fluctuation in irradiation position of the laser light can be further suppressed.

Incidentally, the distance 12 between the cover projection 102 and the deflector 7 (the rotation shaft of the rotatable polygonal mirror 1) with respect to the main scan direction may preferably be shorter than a distance 13 which is a third distance between the supporting member 43 of an optical element and the deflector 7 (the rotation shaft of the rotatable polygonal mirror 1) (12<13). This is because in a constitution in which the distance 12 is made shorter than the distance 13, the temperature rise of the supporting members 43 of the optical element can be effectively prevented. In FIG. 7, a distance, with respect to the longitudinal direction, between an end portion of a longest optical element (for example, the mirror 3a) of the mirror group 3 and the lens group 2, and the deflector 7 (the rotation shaft of the rotatable polygonal mirror 1) is shown as the distance 13. Further, the bottom projections 101 have a width with respect to the sub-scan direction which is larger than a width thereof with respect to the main scan direction.

[Modified Embodiment of Bottom Projection and Cover Projection]

As described above, the bottom projections 101 have the function of raising upward the flows of the air from the deflector 7 in the main scan direction, and the cover projections 102 have the function of changing the flows of the air in the main scan direction to the flows of the air in the sub-scan direction. When such functions can be achieved, shapes of the bottom projections 101 and the cover projections 102 in the Embodiment 1 are not limited. FIG. 8 is a sectional view showing a modified embodiment, and the sectional view is a similar to the sectional view of part (b) of FIG. 7. For example, as shown in FIG. 8, bottom projections 101a and cover projections 102a in the modified embodiment may also be projections formed so as to provide stepped heights from the bottom plate 5b or the upper cover 10 of the optical box 5.

Specifically, each of the bottom projections 101a in the modified embodiment has a stepped portion which is higher in level than the bottom plate 5b at a position of a distance 11 from the rotation shaft of the rotatable polygonal mirror 1, and the air from the deflector 7 is raised by this stepped portion. In other words, the bottom projection 101a projects in a direction approaching the upper cover 10a and forms the stepped portion. That is, the bottom projection 101a is a first stepped portion provided on the bottom plate 5b toward the upper cover 10a at a position of the distance 11 from the rotation shaft of the rotatable polygonal mirror 1 with respect to the longitudinal direction.

Each of the cover projections 102a inn the modified embodiment has a stepped portion extending toward the bottom plate 5b at a position of a distance 12 from the rotation shaft of the rotatable polygonal mirror 1, and changes the direction of the air from the deflector 7, from the main scan direction to the sub-scan direction. In other words, the cover projection 102a projects in a direction approaching the bottom plate 5b and forms the stepped portion. That is, the cover projection 102a is a second stepped portion provided on the surface, opposing the bottom plate 5b, of the upper cover 10a toward the bottom plate 5b at a position of the distance 12 from the rotation shaft of the rotatable polygonal mirror 1 with respect to the longitudinal direction.

The bottom projections 101a and the cover projections 102a which are formed as the stepped portions are formed in a region sandwiched between opposing optical members closest to the deflector 7 in the optical box 5. The bottom projections 101a and the cover projections 102a are formed so that a length thereof with respect to the sub-scan direction is shorter than a length, with respect to the sub-scan direction, of the region sandwiched between the opposing optical members closest to the deflector 7, and are provided in parallel to the sub-scan direction, for example. Further, even when shapes of the stepped portions of the bottom projections 101a and the cover projections 102a are subjected to deformation processes of imparting a C surface, an R surface or the like, the bottom projections 101a and the cover projections 102a are included in the projections in the present invention when the above-described functions are achieved.

As described above, according to the Embodiment 1, it is possible to reduce the change in irradiation position of the light beam by the warm air from the deflector.

Embodiment 2

A constitution of a second embodiment is shown in FIG. 9. FIG. 9 includes schematic views of an upper cover 10 as seen from below (a bottom plate 5b side an optical box 5) the upper cover 10 with respect to an up-down direction. In part (a) of FIG. 9, a distance 1e between an end portion of a cover projection 102b and a deflector 7 (a rotation shaft of a rotatable polygonal mirror 1) with respect to the main scan direction is shorter than a distance 1e between a central portion of the cover projection 102b and the deflector 7 (the rotation shaft of the rotatable polygonal mirror 1) with respect to the main scan direction (1e<1c). In this case, the flow of the air blowing against and branched into the sub-scan direction moves from the central portion toward the end portion of the cover projection 102b in a direction in which the air current moves away from the side wall 5a of the optical box 5. That is, the temperature rise of the optical box 5 can be prevented and the air current can be diffused into all over the entirety of the optical box 5, so that this constitution is effective in reducing the fluctuation of the irradiation position. The cover projection 102c shown in part (a) of FIG. 9 has a dogleg shape projecting toward the side wall 5a.

As the shape of the cover projection 102, a cover projection 102c having a flexed shape as shown in part (b) of FIG. 9. Also in this case, a distance 1e between the end portion of the cover projection 102c and the deflector 7 with respect to the main scan direction is shorter than a distance 1c between a flexed portion of the cover projection 102c and the deflector 7 with respect to the main scan direction (1e<1c). Here, the distance 1e is a distance, with respect to the main scan direction, between at least one end portion of the cover projection 102c and the deflector 7 (the rotation shaft of the rotatable polygonal mirror 1. Further, the distance 1c is a distance from the deflector 7 (the rotation shaft of the rotatable polygonal mirror 1) to a portion, of the cover projection 102c, where the distance from the deflector 7 is largest (a flexed portion in part (b) of FIG. 9). Similarly as part (a), the air current branched into the sub-scan direction by the cover projection 102c is finally formed with respect to a direction in which the air current moves away from the side wall 5a provided with respect to the main scan direction. The cover projection 102c of part (b) of FIG. 9 as a W (or M)-character shape toward the side wall 5a. A part of each of the cover projections 102b and 102c is disposed at a position more distant from the deflector 7 with respect to the main scan direction than the end portion of each of the cover projections 102b and 102c with respect to the sub-scan direction is.

Incidentally, in FIG. 9, the cover projections 102b and 102c were described as a modified example of the cover projection 102 of the Embodiment 1. However, a contour of the cover projection 102a which is the second stepped portion in the Embodiment 1 may also have the "dogleg" shape or the "W"-character shape.

As described above, according to the Embodiment 2, it is possible to reduce a change in irradiation position of the light beam due to the warm air from the deflector.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-164727 filed on Sep. 3, 2018, which is hereby incorporated by reference herein in its entirety.

What is claimed is:

1. An optical scanning apparatus comprising:
a light source configured to emit a light beam;
a deflector including a rotatable polygonal mirror for deflecting the light beam emitted from said light source and configured to rotate said rotatable polygonal mirror;
an optical member configured to guide the light beam, deflected by said rotatable polygonal mirror, to a photosensitive drum;
a supporting portion supporting said optical member;
a casing including a bottom and a side wall standing from said bottom, wherein said light source is provided on said side wall, and said supporting portion is provided on said bottom;
a cover member configured to cover an opening which is surrounded by said side wall and which permits passing of said deflector when said deflector is installed on said bottom;
a first air current deflecting portion configured to deflect, to a direction from said bottom toward said cover member, an air current generated by rotation of said rotatable polygonal mirror and flowing along a longitudinal direction of said optical member; and
a second air current deflecting portion provided on said cover member and configured to deflect, to a direction crossing the longitudinal direction, the air current deflected by said first air current deflecting portion and flowing in the longitudinal direction.

2. An optical scanning apparatus according to claim 1, wherein a first distance from a rotation shaft of said rotatable polygonal mirror to said first air current deflecting portion with respect to the longitudinal direction is shorter than a second distance from the rotation shaft to said second air current deflecting portion with respect to the longitudinal direction.

3. An optical scanning apparatus according to claim 2, wherein said optical member includes a closest optical member to said deflector with respect to the direction crossing the longitudinal direction, and said supporting portion includes a remotest supporting portion from said deflector with respect to the longitudinal direction, and wherein a third distance from said rotation shaft to said remotest supporting portion is longer than the second distance.

4. An optical scanning apparatus according to claim 2, wherein said first air current deflecting portion is provided on said bottom at two opposing positions, sandwiching said deflector therebetween, each having the first distance and is a first projection projecting toward said cover member, and wherein said second air current deflecting portion is provided on said cover member at two opposing positions, sandwiching said deflector therebetween, each having the second distance and is a second projection projecting toward said bottom.

5. An optical scanning apparatus according to claim 2, wherein said first air current deflecting portion is a first stepped portion provided on said bottom at the first position so as to approach said cover member, and wherein said second air current deflecting portion is a second stepped portion provided on said cover member at the second position so as to approach said bottom.

6. An optical scanning apparatus according to claim 1, wherein said second air current deflecting portion extends substantially in parallel to the direction crossing the longitudinal direction.

7. An optical scanning apparatus according to claim 1, wherein a distance from a rotation shaft of said rotatable polygonal mirror to an end of said second air current deflecting portion with respect to the direction crossing the longitudinal direction is shorter than a distance from the rotation shaft to said second air current deflecting portion with respect to the longitudinal direction.

8. An optical scanning apparatus according to claim 1, wherein said optical member includes a closest optical member to said deflector with respect to the direction crossing the longitudinal direction, and wherein said supporting portion supports said closest optical member and is a wall-like member configured to block flare light from entering said closest optical member.

9. An optical scanning apparatus according to claim 1, wherein said light source includes a first light source emitting a first light beam and a second light source emitting a second light beam, and wherein the first light beam and the second light beam are incident on said rotatable polygonal mirror obliquely with respect to a rotational axis of said rotatable polygonal mirror, and wherein said rotatable polygonal mirror deflects the first light beam and the second light beam toward opposite sides, respectively, with respect to the rotational axis.

10. An image forming apparatus comprising:

a photosensitive drum;

an optical scanning apparatus according to claim 1 configured to form an electrostatic latent image on said photosensitive drum;

a developing device configured to develop the electrostatic latent image, formed by said optical scanning apparatus, into a toner image; and an endless belt onto which the toner image formed by said developing device is transferred.

* * * * *